US011610297B2

(12) United States Patent
Pandev

(10) Patent No.: US 11,610,297 B2
(45) Date of Patent: Mar. 21, 2023

(54) TOMOGRAPHY BASED SEMICONDUCTOR MEASUREMENTS USING SIMPLIFIED MODELS

(71) Applicant: KLA Corporation, Milpitas, CA (US)

(72) Inventor: Stilian Ivanov Pandev, Santa Clara, CA (US)

(73) Assignee: KLA Corporation, Milpitas, CA (US)

(*) Notice: Subject to any disclaimer, the term of this patent is extended or adjusted under 35 U.S.C. 154(b) by 295 days.

(21) Appl. No.: 16/951,933

(22) Filed: Nov. 18, 2020

(65) Prior Publication Data
US 2021/0166375 A1 Jun. 3, 2021

Related U.S. Application Data

(60) Provisional application No. 62/942,735, filed on Dec. 2, 2019.

(51) Int. Cl.
G06T 7/00 (2017.01)
G06T 7/60 (2017.01)
(Continued)

(52) U.S. Cl.
CPC .......... *G06T 7/0006* (2013.01); *G06N 20/00* (2019.01); *G06T 7/60* (2013.01); *G06T 11/008* (2013.01);
(Continued)

(58) Field of Classification Search
CPC .......... G06T 7/00; G06T 7/0006; G06T 7/60; G06T 11/008; G06T 2207/10116;
(Continued)

(56) References Cited

U.S. PATENT DOCUMENTS 5,608,526 A 3/1997 Piwonka-Corle et al.
5,859,424 A 1/1999 Norton et al.
(Continued)

FOREIGN PATENT DOCUMENTS

JP 2014-096400 A 5/2014
KR 10-2009-0023248 A 3/2009
WO 2019173170 A1 9/2019

OTHER PUBLICATIONS

Lemaillet, Germer, Kline et al.,"Intercomparison between optical and x-ray scatterometry measurements of FinFET structures" by Proc. SPIE, v.8681, p. 86810Q (2013).
(Continued)

*Primary Examiner* — Tung S Lau
(74) *Attorney, Agent, or Firm* — Spano Law Group; Joseph S. Spano

(57) ABSTRACT

Methods and systems for improved regularization associated with tomographically resolved image based measurements of semiconductor structures are presented herein. The regularizations described herein are based on measurement data and parameterization of a constrained voxel model that captures known process variations. The constrained voxel model is determined based on simplified geometric models, process models, or both, characterizing the structure under measurement. A constrained voxel model has dramatically fewer degrees of freedom compared to an unconstrained voxel model. The value associated with each voxel of the constrained voxel model depends on a relatively small number of independent variables. Selection of the independent variables is informed by knowledge of the structure and the underlying fabrication process. Regularization based on a constrained voxel model enables faster convergence and a more accurate reconstruction of the measured structure with less computational effort. This enables semiconductor mea-
(Continued)

surements with reduced data acquisition requirements, and reduced measurement time.

24 Claims, 11 Drawing Sheets

(51) Int. Cl.
*G06N 20/00* (2019.01)
*G06T 11/00* (2006.01)
(52) U.S. Cl.
CPC ............... *G06T 2207/10116* (2013.01); *G06T 2207/30148* (2013.01)
(58) Field of Classification Search
CPC ..... G06T 2207/30148; G06T 2211/424; G06T 11/006; G06N 20/00; G06N 3/0454; G06N 3/088
See application file for complete search history.

(56) References Cited

U.S. PATENT DOCUMENTS

| | | | |
|---|---|---|---|
| 6,023,338 A | 2/2000 | Bareket | |
| 6,429,943 B1 | 8/2002 | Opsal et al. | |
| 6,716,646 B1 | 4/2004 | Wright et al. | |
| 6,778,275 B2 | 8/2004 | Bowes | |
| 6,787,773 B1 | 9/2004 | Lee | |
| 6,992,764 B1 | 1/2006 | Fang et al. | |
| 7,242,477 B2 | 7/2007 | Mieher et al. | |
| 7,321,426 B1 | 1/2008 | Poslavsky et al. | |
| 7,406,153 B2 | 7/2008 | Berman | |
| 7,478,019 B2 | 1/2009 | Zangooie et al. | |
| 7,626,702 B2 | 12/2009 | Ausschnitt et al. | |
| 7,656,528 B2 | 2/2010 | Abdulhalim et al. | |
| 7,826,071 B2 | 11/2010 | Shchegrov et al. | |
| 7,842,933 B2 | 11/2010 | Shur et al. | |
| 7,873,585 B2 | 1/2011 | Izikson | |
| 7,929,667 B1 | 4/2011 | Zhuang et al. | |
| 7,933,026 B2 | 4/2011 | Opsal et al. | |
| 8,068,662 B2 | 11/2011 | Zhang et al. | |
| 8,138,498 B2 | 3/2012 | Ghinovker | |
| 9,291,554 B2 | 3/2016 | Kuznetsov et al. | |
| 9,826,614 B1 | 11/2017 | Bakeman et al. | |
| 9,885,962 B2 | 2/2018 | Veldman et al. | |
| 9,915,522 B1 | 3/2018 | Jiang et al. | |
| 10,013,518 B2 | 7/2018 | Bakeman et al. | |
| 10,101,670 B2 | 10/2018 | Pandev et al. | |
| 10,152,678 B2 | 12/2018 | Pandev et al. | |
| 10,324,050 B2 | 6/2019 | Hench et al. | |
| 10,352,695 B2 | 7/2019 | Dziura et al. | |
| 10,727,142 B2* | 7/2020 | Gellineau | G01N 23/20083 |
| 10,983,227 B2* | 4/2021 | Hench | G01N 21/47 |
| 2003/0021465 A1 | 1/2003 | Adel et al. | |
| 2007/0176128 A1 | 8/2007 | Van Bilsen et al. | |
| 2007/0221842 A1 | 9/2007 | Morokuma et al. | |
| 2009/0152463 A1 | 6/2009 | Toyoda et al. | |
| 2011/0038527 A1* | 2/2011 | Liu | G06T 7/74 |
| | | | 382/145 |
| 2011/0266440 A1 | 11/2011 | Boughorbel et al. | |
| 2012/0292502 A1 | 11/2012 | Langer et al. | |
| 2013/0208279 A1 | 8/2013 | Smith | |
| 2013/0304424 A1 | 11/2013 | Bakeman et al. | |
| 2014/0019097 A1 | 1/2014 | Bakeman et al. | |
| 2014/0064445 A1 | 3/2014 | Adler | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2014/0341462 A1* | 11/2014 | Sezginer | G06K 9/6252 |
| | | | 382/149 |
| 2015/0024337 A1* | 1/2015 | Blassnig | G06T 7/579 |
| | | | 433/29 |
| 2015/0046121 A1 | 2/2015 | Dziura et al. | |
| 2015/0110249 A1 | 4/2015 | Bakeman et al. | |
| 2015/0117610 A1 | 4/2015 | Veldman et al. | |
| 2015/0204664 A1 | 7/2015 | Bringoltz et al. | |
| 2015/0285749 A1 | 10/2015 | Moncton et al. | |
| 2015/0300965 A1 | 10/2015 | Sezginer et al. | |
| 2016/0202193 A1 | 7/2016 | Hench et al. | |
| 2016/0320319 A1 | 11/2016 | Hench et al. | |
| 2016/0335753 A1* | 11/2016 | Sezginer | G01N 21/95607 |
| 2017/0069080 A1* | 3/2017 | Sezginer | G06T 7/0006 |
| 2017/0167862 A1 | 6/2017 | Dziura et al. | |
| 2018/0106735 A1 | 4/2018 | Gellineau et al. | |
| 2018/0113084 A1 | 4/2018 | Hench et al. | |
| 2018/0328868 A1 | 11/2018 | Bykanov et al. | |
| 2018/0350699 A1* | 12/2018 | Gellineau | H01L 21/67253 |
| 2019/0017946 A1 | 1/2019 | Wack et al. | |
| 2019/0293578 A1 | 9/2019 | Gellineau | |
| 2020/0080836 A1* | 3/2020 | Hench | G01B 11/24 |

OTHER PUBLICATIONS

Kline et al., "X-ray scattering critical dimensional metrology using a compact x-ray source for next generation semiconductor devices," J. Micro/Nanolith. MEMS MOEMS 16(1), 014001 (Jan.-Mar. 2017).
International Search Report dated Mar. 26, 2021, for PCT Application No. PCT/US2020/062630 filed on Dec. 1, 2020 by KLA Corporation, 3 pages.

* cited by examiner

TOMOGRAPHY BASED SEMICONDUCTOR MEASUREMENTS USING SIMPLIFIED MODELS

CROSS REFERENCE TO RELATED APPLICATION

The present application for patent claims priority under 35 U.S.C. § 119 from U.S. provisional patent application Ser. No. 62/942,735 entitled "Data Driven Hybrid Tomography Using Simplified Models," filed Dec. 2, 2019, the subject matter of which is incorporated herein by reference in its entirety.

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical and X-ray based metrology techniques offer the potential for high throughput without the risk of sample destruction. A number of metrology based techniques including scatterometry, reflectometry, and ellipsometry implementations and associated analysis algorithms are commonly used to characterize critical dimensions, film thicknesses, composition, overlay and other parameters of nanoscale structures.

Many metrology techniques are indirect methods of measuring physical properties of a specimen under measurement. In most cases, the raw measurement signals cannot be used to directly determine the physical properties of the specimen. Instead, some type of measurement model is iteratively resolved to match the raw measurement signals. Once resolved, the measurement model is employed to estimate values of one or more parameters of interest.

In some examples, image data is analyzed using a tomographic technique to resolve a tomographic measurement model. In some examples, the tomographic measurement model is a grid array of voxels spanning a three dimensional volume enveloping the measured structure. The size and spacing of the voxels of the array is known apriori. Tomography is an optimization process employed to determine the value of a property (e.g., transparency, electron density, etc.) associated with each voxel of the voxel model. The optimization process determines values of the property associated with each voxel that minimize the difference between simulated and measured image data, and thus reconstruct the measured structure as a resolved voxel model.

In typical semiconductor metrology applications, a voxel model of a measured structure includes a large number of voxels (e.g., one million or more voxels) to provide sufficient resolution to accurately estimate parameters of interest (e.g., critical dimensions, height, sidewall angle, etc.). This makes the tomographic optimization problem mathematically underdetermined, i.e., million or more voxel parameters to resolve based on relatively few actual measurement samples. To overcome the inherent underdetermined nature of the tomographic optimization problem, one or more forms of regularization are employed as part of the optimization process.

Unfortunately, typical, generic regularization employed in tomographic analysis (e.g., total variation regularization, L1 regularization, etc.) limit measurement performance. In some examples, the application of generic regularization terms is weak, allowing the optimization to fall into local minima and leading to unrealistic and inaccurate measurement results. In some examples, the application of generic regularization terms results in excessively strong regularization leading to measurement results that lack sufficient detail.

Future metrology applications present challenges for metrology due to increasingly small resolution requirements, multi-parameter correlation, increasingly complex geometric structures, and increasing use of opaque materials. Typical tomographic techniques employed in semiconductor metrology employ generic regularization that is not tailored to the structure under measurement. This often leads to convergence in local minima and incorrect reconstruction. Thus, methods and systems for improved regularization associated with tomographic based measurements of semiconductor structures are desired.

SUMMARY

Methods and systems for improved regularization associated with tomographically resolved image based measurements of semiconductor structures are presented herein. More specifically, the regularizations described herein are based on data (e.g., simulated data, real data, or both) and parameterization of a constrained voxel model that captures known process variations. The constrained voxel model is determined based on simplified geometric models, process models, or both, characterizing the structure under measurement. Regularization based on a constrained voxel model that accurately represents process variations enables convergence to a more accurate reconstruction of the measured structure with less computational effort. This enables semiconductor measurements with reduced data acquisition requirements, e.g., fewer measured angles, and reduced move-acquire-move (MAM) times.

A three dimensional voxel model includes an array of voxels, i.e., three dimensional volumes, that envelopes a structure under measurement. Each voxel defines the location of a particular volume in space and a property of the material occupying each particular volume. The value associated with each voxel of an unconstrained voxel model is independent of the other voxels of the voxel model. Thus, an unconstrained voxel model has a number of degrees of freedom equal to the number of voxels comprising the voxel model.

In one aspect, a tomographic measurement engine receives a constrained voxel model of the structure under measurement. The constrained voxel model includes the same number of voxels in the same arrangement as the voxel model. However, the constrained voxel model has dramatically fewer degrees of freedom compared to the voxel model. The value associated with each of the voxels of the constrained voxel model depends on a relatively small number of independent variables, and the selection of the independent variables is informed by knowledge of the structure under measurement and the process employed to fabricate the structure.

The tomographic measurement engine also receives a set of measured images of a structure under measurement by a semiconductor measurement system. In addition, the tomographic measurement engine simulates the measurement of the structure by the semiconductor metrology system based on a voxel model. Furthermore, the tomographic measurement engine updates the value associated with each voxel of voxel model based on both the difference between the set of measured images and the set of simulated images and a voxel by voxel difference between the voxel model and the constrained voxel model.

In a further aspect, a tomographic measurement engine generates the constrained voxel model of the structure from the full set of measured images that drive the tomographic optimization, a subset of the full set of measured images, an amount of measurement data collected from the structure under measurement by another semiconductor measurement system, or a combination thereof.

In some embodiments, the constrained voxel model is synthesized independent from the optimization employed to update the voxel model. In some embodiments, a trained constrained voxel model synthesis model directly determines a constrained voxel model from measurement data. In some embodiments, a regression model or a trained machine learning based model is employed to determines value of one or more parameters characterizing the structure under measurement from measurement data, and a trained decoder model generates a constrained voxel model from the values of the one or more parameters.

In some other embodiments, the constrained voxel model is synthesized as part of the optimization employed to update the voxel model.

In another further aspect, a tomographic optimization is driven by a difference between a set of measured images of the structure and a set of simulated images characterizing each measurement of the structure generated based on the constrained voxel model.

In yet another further aspect, a tomographic optimization is driven by a difference between a set of simulated images characterizing each measurement of the structure generated based on the voxel model and a set of simulated images characterizing each measurement of the structure generated based on the constrained voxel model.

In another further aspect, a decoder model is employed in several embodiments to transform a relatively small set of independent parameters into a voxel model representation having a much larger dimension. In other words, a decoder model provides a mapping from a reduced parameter space to voxel space.

In some embodiments, a decoder model is machine learning based model (e.g., linear model, neural network model, convolutional neural network model, etc.) trained based on synthetically generated data, actual measurement data, or user defined data. However, in general, a decoder model may be suitable linear or non-linear model.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for improved regularization associated with tomographically resolved image based measurements of semiconductor structures are presented herein. More specifically, the regularizations described herein are based on data (e.g., simulated data, real data, or both) and parameterization of a constrained voxel model that captures known process variations. The constrained voxel model is determined based on simplified geometric models, process models, or both, characterizing the structure under measurement. Regularization based on a constrained voxel model that accurately represents process variations enables convergence to a more accurate reconstruction of the measured structure with less computational effort. This enables semiconductor measurements with reduced data acquisition requirements, e.g., fewer measured angles, and reduced move-acquire-move (MAM) times.

Figure 1:
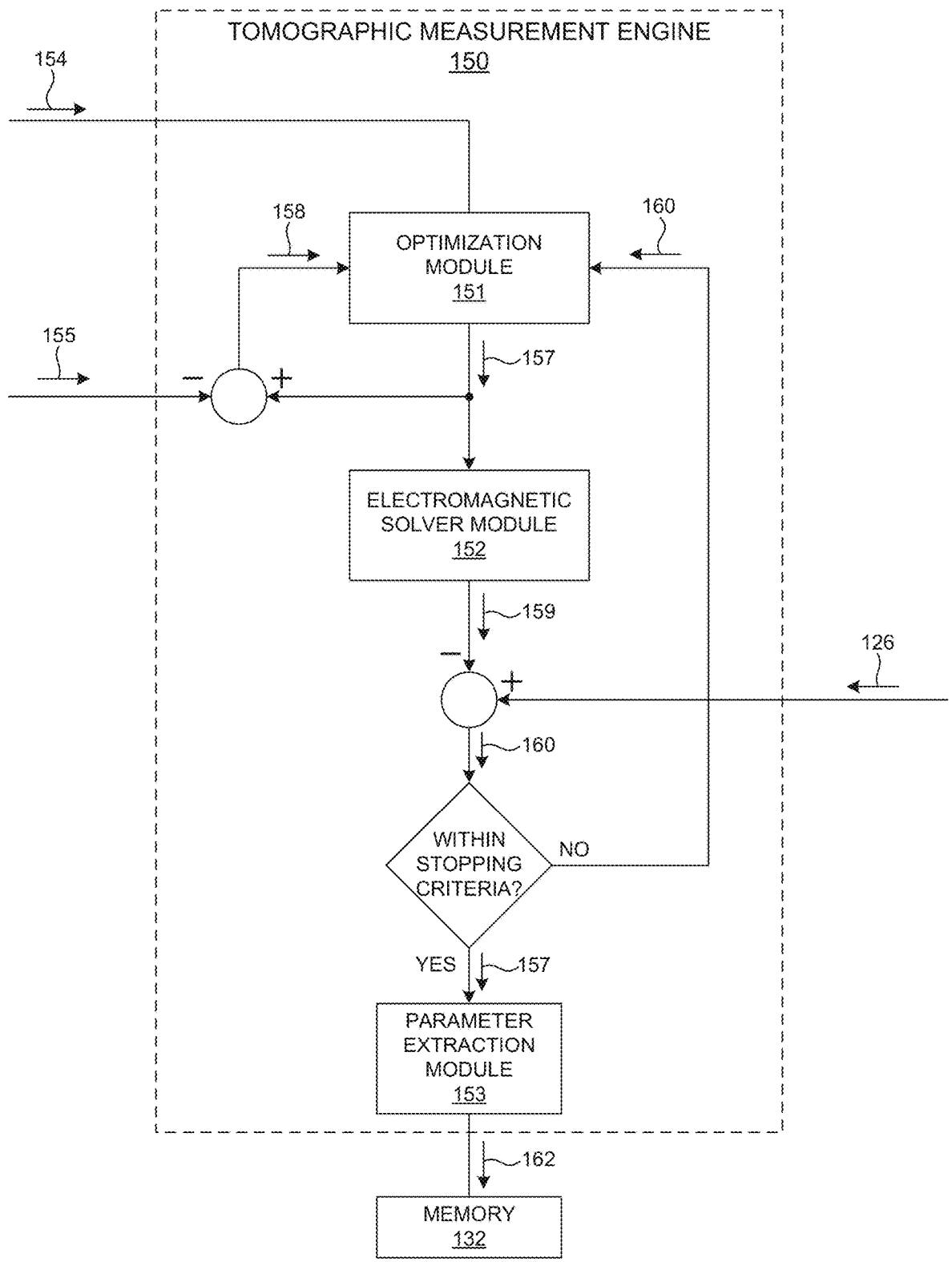
FIG. 1 is a diagram illustrative of an exemplary tomographic measurement engine 150 in one embodiment.

FIG. 1 is a diagram illustrative of an exemplary tomographic measurement engine 150 in one embodiment. As depicted in FIG. 1, tomographic measurement engine 150 includes an optimization module 151, an electromagnetic solver module 152, and a parameter extraction module 153. Tomographic measurement engine 150 estimates values of parameters of interest 162 characterizing a structure under measurement, e.g., a semiconductor structure under measurement by an X-ray based metrology system. In some embodiments, the parameters of interest include a geometric parameter of interest, a process parameter of interest, an electrical parameter of interest, a dispersion parameter of interest, etc. By way of non-limiting example, a parameter of interest may be an overlay dimension, a critical dimension, a lithographic focus, a lithographic dosage, an etch exposure time, etc.

As depicted in FIG. 1, tomographic measurement engine 150 receives a set of measured images 126 of a structure under measurement by a semiconductor metrology system, e.g., a small-angle x-ray scatterometry (SAXS) metrology system. In one example, each measured image is an image of the x-ray photons diffracted from the structure under measurement and captured by a detector of a SAXS metrology system. The set of measured images 126 includes a number of diffraction images each associated with a different measurement instance. Each measurement instance is a measurement undertaken at a different nominal angle of incidence, nominal azimuth angle, or both. In this manner, the set of measured images 126 includes images collected at a number of different nominal angles of incidence, nominal azimuth angles, or both.

Figure 4:
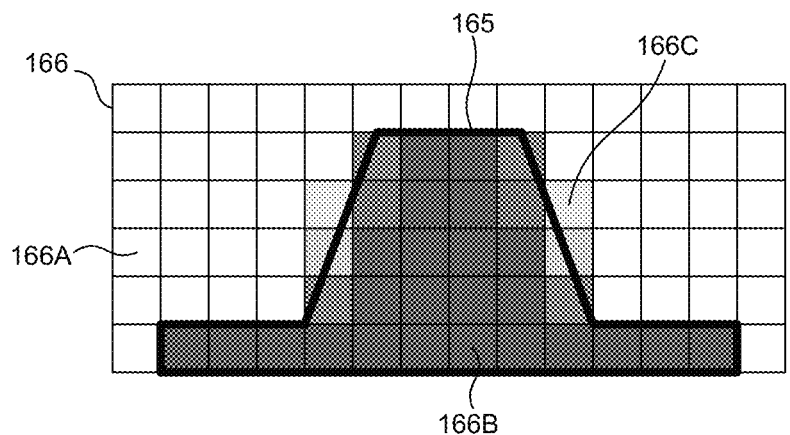
FIG. 4 is a diagram illustrative of a cross-sectional view of a three dimensional voxel model characterizing a trapezoidal structure.

As depicted in FIG. 1, optimization module 151 receives initial values 154 of a voxel model of the structure under measurement. FIG. 4 depicts a cross-sectional view of a three dimensional voxel model characterizing a trapezoidal structure 165. As depicted in FIG. 4, voxel model 166 includes an array of voxels, i.e., three dimensional volumes, each having a cube-like shape. In the embodiment depicted in FIG. 4, each voxel is the same size and shape. The array of voxels envelopes the structure under measurement. The number of voxels is known apriori and remains constant during the tomographic analysis. Each voxel defines the location of a particular volume in space and a property of the material occupying each particular volume. In the context of X-ray based metrology, by way of non-limiting example, the property may be electron density. In the context of optical metrology, by way of non-limiting example, the property may be transparency.

As illustrated in FIG. 4, each voxel is shaded differently depending on the value of the material property associated with each voxel. For example, voxel 166A is completely occupied by air which has a relatively low electron density, whereas voxel 166B is completely occupied by a semiconductor material which has a relatively high electron density. Some voxels, such as voxel 166C is partially filled by air and partially filled by semiconductor material. Thus, the value of the material property of voxel 166C lies between the values associated with voxels 166A and 166B. The initial values 154 received by optimization module 151 are employed to define the initial voxel model of the structure under measurement. In some examples, initial values 154 may be selected randomly. In other examples, initial values 154 are selected to best model the expected shape and material properties of the structure under measurement.

Each voxel of an unconstrained voxel model, such as voxel model 157 is independent of the other voxels of the voxel model. In other words, the material value associated with each of the voxels of the voxel model is independent of the value associated with each of the other voxels of the voxel model. Thus, the voxel model has a number of degrees of freedom equal to the number of voxels comprising the voxel model. In some embodiments, a voxel model employed in a semiconductor measurement includes a 100× 100×100 array of voxels. In general, a voxel model employed in a semiconductor measurement includes one million or more voxels.

As illustrated in FIG. 4, voxel model 157 is communicated to electromagnetic solver module 152. Electromagnetic solver module 152 simulates the measurement of the structure characterized by the voxel model 157 by the semiconductor metrology system at each measurement instance. Hence, electromagnetic solver 152 generates a set of simulated images 159 that corresponds to the set of measured images 126.

Tomographic measurement engine 150 determines the difference between each corresponding simulated image and measured image of the sets of simulated images 159 and measured images 126. The magnitudes of the difference images 160 are checked against predetermined stopping criteria.

Figure 3:
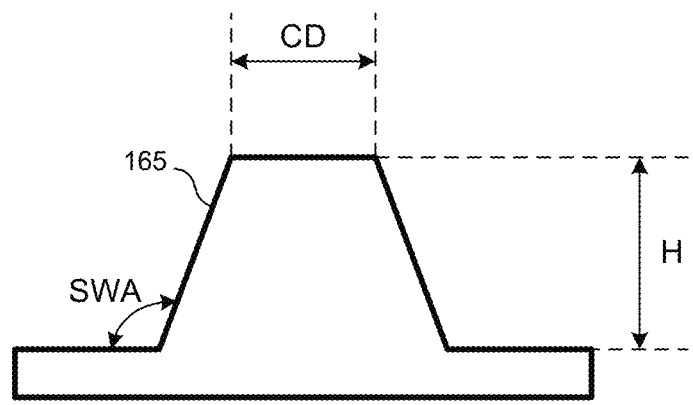
FIG. 3 is a diagram illustrative of a simple, geometrically parameterized model characterizing the shape of a trapezoidal structure.

If the differences are within the stopping criteria, the current voxel model 157 is communicated to parameter extraction module 153. Parameter extraction module 153 estimates values of one or more parameters of interest 162 characterizing the structure under measurement from the voxel model 157. FIG. 3 depicts a simple, geometrically parameterized model characterizing the shape of trapezoid structure 165. As illustrated in FIG. 3, the geometric model characterizes the size and shape of the trapezoidal shaped structure 165 by a height parameter, H, a critical dimension parameter, CD, and a sidewall angle parameter, SWA. In general, any suitable parameterized model may be employed to describe the size and shape of a structure under measurement. Parameter extraction module 153 selects values of the parameters of the parameterized model, e.g., H, CD, and SWA, that best fit the shape of structure 165 outlined by the electron density map of structure 165 provided by voxel model 157. In this manner, parameter extraction module 153 estimates values of the parameters of interest, e.g., any of H, CD, and SWA.

If the magnitudes of the difference images 160 are not within the stopping criteria, the difference images 160 are communicated to optimization module 151.

In one aspect, tomographic measurement engine 150 receives a constrained voxel model 155 of the structure. The constrained voxel model 155 includes the same number of voxels in the same arrangement, i.e., the same sized voxels occupying the same locations, as the voxel model. However, the constrained voxel model has dramatically fewer degrees of freedom compared to the voxel model. In other words, the material value associated with each of the voxels of the constrained voxel model is not independent of the value associated with each of the other voxels of the constrained voxel model. More specifically, the material value associated with each of the voxels of the constrained voxel model depends on a relatively small number of independent variables, and the selection of the independent variables is informed by knowledge of the structure under measurement and the process employed to fabricate the structure.

As depicted in FIG. 4, tomographic measurement engine 150 determines the difference 158 between voxel model 157 and constrained voxel model 155. The difference 158 between voxel model 157 and constrained voxel model 155 is determined on a voxel by voxel basis. Furthermore, optimization module updates the value associated with each voxel of voxel model 157 based on both the difference 160 between the set of measured images 126 and the set of simulated images 159 and the difference 158 between the voxel model 157 and the constrained voxel model 155. In one example, optimization module 151 updates the value associated with each voxel of voxel model 157 that minimizes a loss function illustrated by equation (1).

$$J(P,Vox;Img) = \|EMSolv(Vox) - Img\|_x^2 + \gamma_1 \cdot RegV(Vox, CVox) \quad (1)$$

As illustrated by equation (1), loss function, J, includes a voxel model regularization term, RegV, weighted by weighting factor, $\gamma_1$. In this manner, the optimization is driven by the square of the difference between the measured images, Img, and the simulated images derived from the voxel model, EMSolv(Vox). In one example, the regularization term, RegV, is the difference between the voxel model, Vox, and the constrained voxel model, CVox. In addition, loss function, J, may include additional regularization terms such as total variation, L1, etc. In general, regularization term, RegV, regularizes the optimization process because the variable space of the constrained voxel model is much smaller than the voxel model, e.g., dimension on the order of 100, rather than 1,000,000. The regularization term, RegV, effectively draws the optimization away from local minima and toward a global minimum.

Figure 2:
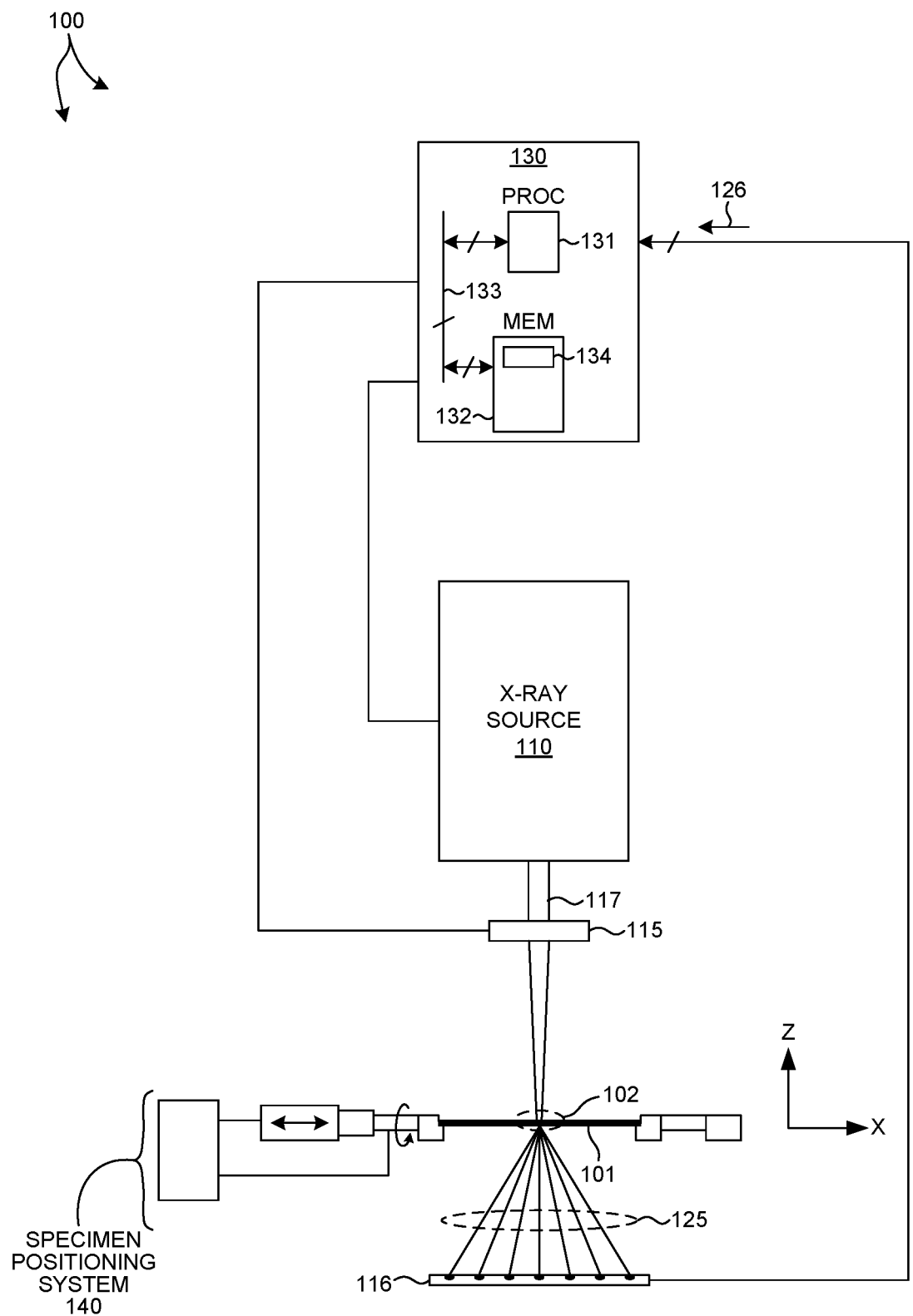
FIG. 2 is a diagram illustrative of an embodiment of a Small-Angle X-ray Scatterometry (SAXS) metrology tool for measuring characteristics of a specimen in accordance with the exemplary methods presented herein.

As described hereinbefore, the set of measured images 126 of the structure under measurement may be generated by a SAXS metrology system. FIG. 2 illustrates an embodiment of a SAXS metrology tool 100 for measuring characteristics of a specimen in accordance with the exemplary methods presented herein. As shown in FIG. 2, the system 100 may be used to perform x-ray scatterometry measurements of a structure within a measurement area 102 of a specimen 101 disposed on a specimen positioning system 140. In some embodiments, the measurement area 102 has a spot size of eighty micrometers or less. In some embodiments, the measurement area 102 has a spot size of fifty micrometers or less. In some embodiments, the measurement area 102 has a spot size of forty micrometers or less.

In the depicted embodiment, SAXS metrology tool 100 includes an x-ray illumination source 110 that generates x-ray radiation suitable for x-ray scatterometry measurements. In some embodiments, the x-ray illumination source 110 generates wavelengths between 0.01 nanometers and 1 nanometer. X-ray illumination source 110 produces an x-ray beam 117 incident on inspection area 102 of specimen 101.

In general, any suitable high-brightness x-ray illumination source capable of generating high brightness x-rays at flux levels sufficient to enable high-throughput, inline metrology may be contemplated to supply x-ray illumination for x-ray scatterometry measurements as described herein. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, and an inverse Compton source may be employed as x-ray source 110. In one example, an inverse Compton source available from Lyncean Technologies, Inc., Palo Alto, Calif. (USA) may be contemplated. Inverse Compton sources have an additional advantage of being able to produce x-rays over a range of photon energies, thereby enabling the x-ray source to deliver x-ray radiation at different, selectable wavelengths. Exemplary x-ray sources include electron beam sources configured to bombard solid or liquid targets to stimulate x-ray radiation. In some embodiments, x-ray illumination source 110 is a liquid metal based x-ray illumination system. A jet of liquid metal including one or more elements is generated. By way of non-limiting example, the jet of liquid metal includes any of Aluminum, Gallium, Indium, Tin, Thallium, and Bismuth. An electron beam source (e.g., electron gun) produces a stream of electrons directed by electron optics to the jet of liquid metal. Suitable electron optics include electromagnets, permanent magnets, or a combination of electromagnets and permanent magnets for focusing the electron beam and directing the beam at the liquid metal jet. The coincidence of the jet of liquid metal and the stream of electrons produces an x-ray beam 117 incident on inspection area 102 of specimen 101. In this manner, the jet of liquid metal produces x-ray lines corresponding with its constituent elements. In one embodiment, the jet of liquid metal includes a Gallium and Indium alloy.

Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

In one embodiment, the incident x-ray beam 117 is at the Indium k$\alpha$ line of 24.2 keV. The x-ray beam is collimated down to less than one milliradian divergence using multilayer x-ray optics for x-ray scatterometry measurements.

In some embodiments, the x-ray scattering measurements described herein are achieved without using a screen located between the x-ray source and the specimen under measurement. In these embodiments, the measured intensities of the beam over a range of angles of incidence, multiple wavelengths, or a combination of both, provide sufficient information to resolve a distribution map (i.e., image) of a desired material property (e.g., complex refractive index, electron density, or absorptivity) of the measured structure. However, in some other examples, a pinhole or another aperture is located on an otherwise opaque screen that is located between the x-ray source and the specimen under measurement to improve collimation of the x-ray beam. The intensity of the diffraction pattern is measured for several positions of the aperture. In some other embodiments, a screen with a pseudo-random aperture pattern is used, and the diffraction pattern is measured for multiple screens. These approaches may also be contemplated to provide additional information to resolve the three-dimensional distribution of the desired material property of the measured structure.

In some embodiments, the profile of the incident x-ray beam is controlled by two or more apertures, slits, or a combination thereof. In a further embodiment, the apertures, slits, or both, are configured to rotate in coordination with the orientation of the specimen to optimize the profile of the incident beam for each angle of incidence, azimuth angle, or both.

As depicted in FIG. 2, x-ray optics 115 shape and direct incident x-ray beam 117 to specimen 101. In some examples, x-ray optics 115 include an x-ray monochromator to monochromatize the x-ray beam that is incident on the specimen 101. In one example, a crystal monochromator such as a Loxley-Tanner-Bowen monochromator is employed to monochromatize the beam of x-ray radiation. In some examples, x-ray optics 115 collimate or focus the x-ray beam 117 onto inspection area 102 of specimen 101 to less than 1 milliradian divergence using multilayer x-ray optics. In some embodiments, x-ray optics 115 includes one or more x-ray collimating mirrors, x-ray apertures, x-ray beam stops, refractive x-ray optics, diffractive optics such as zone plates, specular x-ray optics such as grazing incidence ellipsoidal mirrors, polycapillary optics such as hollow capillary x-ray waveguides, multilayer optics, or systems, or any combination thereof. Further details are described in U.S. Patent Publication No. 2015/0110249, the content of which is incorporated herein by reference it its entirety.

In general, the focal plane of the illumination optics system is optimized for each measurement application. In this manner, system 100 is configured to locate the focal plane at various depths within the specimen depending on the measurement application.

X-ray detector 116 collects x-ray radiation 125 scattered from specimen 101 and generates an output signal 126 indicative of properties of specimen 101 that are sensitive to the incident x-ray radiation. In some embodiments, scattered x-rays 125 are collected by x-ray detector 116 while specimen positioning system 140 locates and orients specimen 101 to produce angularly resolved scattered x-rays.

Metrology system 100 includes one or more photon counting detectors with high dynamic range (e.g., greater than $10^5$) and thick, highly absorptive crystal substrates that absorb the direct beam (i.e., zero order beam) without damage and with minimal parasitic backscattering. Exemplary detector materials suitable for full beam x-ray scatterometry include Cadmium Telluride (CdTe), Germanium (Ge) and Gallium Arsenide (GaAs) crystals, and others. In some embodiments, the detector material is selected to provide high conversion efficiency in a narrow energy band corresponding to the source energy.

In some embodiments, a single photon counting detector detects the position and number of detected photons. In some embodiments, dual threshold detectors are employed to improve SNR.

X-ray detector 116 resolves one or more x-ray photon energies and produces signals for each x-ray energy component indicative of properties of the specimen. In some embodiments, the x-ray detector 116 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 126 for further processing and storage.

A high aspect ratio, vertically manufactured structure diffracts a collimated X-ray beam into diffraction orders. Each diffraction order travels in a particular, predictable direction. The angular spacing of the diffraction orders is inversely proportional to the lattice constant of the specimen divided by the wavelength. The diffraction orders are detected by a detector array placed at some distance from the wafer. Each pixel of the detector outputs a signal that indicates the number of photons that hit the pixel.

As depicted in FIG. 2, SAXS metrology system 100 includes a computing system 130 employed to acquire signals 126 generated by detector 116 and determine properties of the structure of interest based at least in part on the acquired signals. FIGS. 1, 5, 8, and 9 depict illustrations of different embodiments of a tomographic measurement engine 150 to estimate values of one or more geometric parameters, composition parameters, or both, characterizing a complex semiconductor structure based on x-ray scatterometry measurement data associated with the complex semiconductor structure. In some embodiments, x-ray scatterometry data 126 is collected from a wafer by an x-ray scatterometry system such as metrology system 100 depicted in FIG. 2. Moreover, in some embodiments, computing system 130 is configured as a tomographic measurement engine 150 as described herein.

In a further aspect, a tomographic measurement engine generates the constrained voxel model of the structure from the full set of measured images that drive the tomographic optimization, a subset of the full set of measured images, an amount of measurement data collected from the structure under measurement by another semiconductor measurement system, or a combination thereof.

Figure 5:
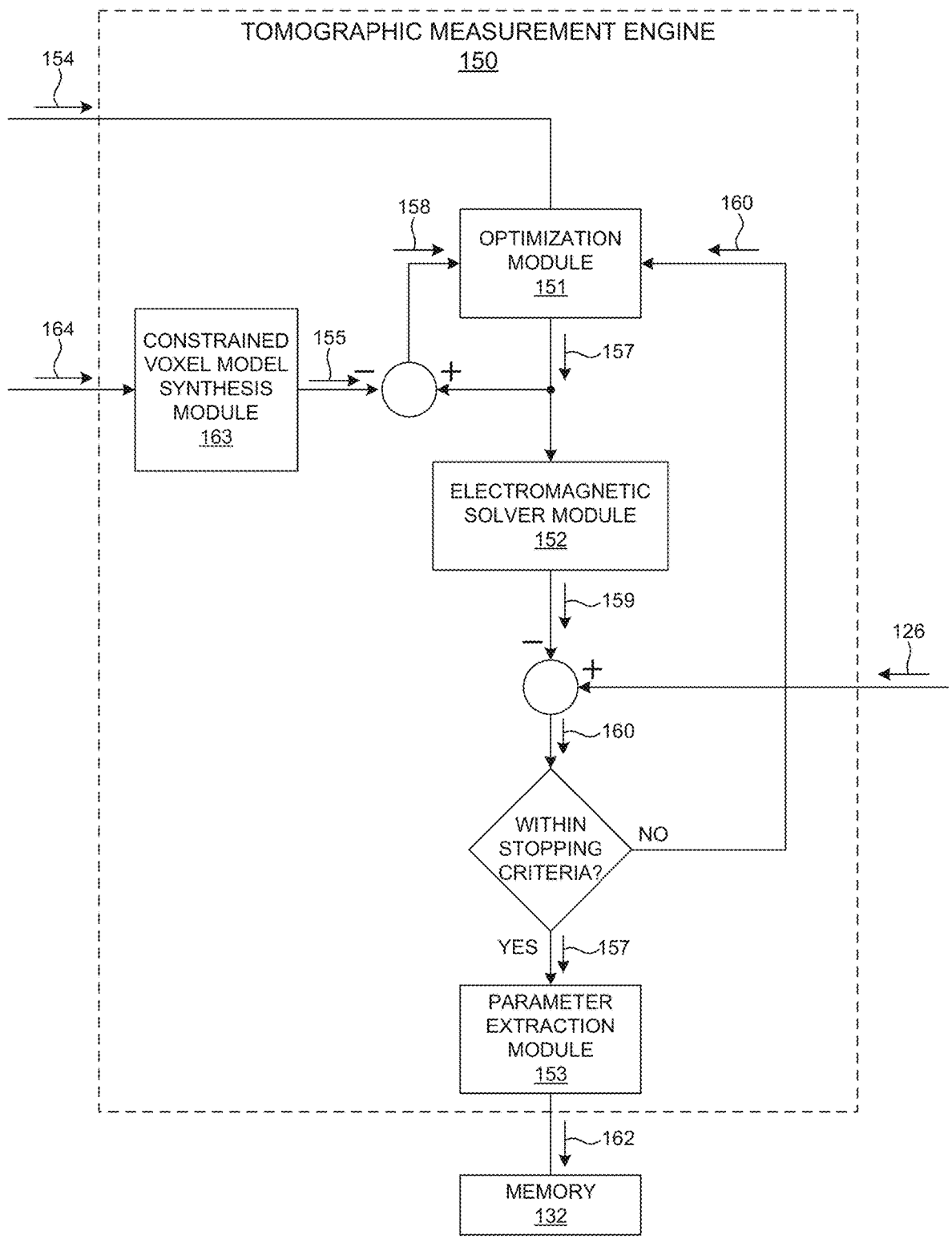
FIG. 5 is a diagram illustrative of an exemplary tomographic measurement engine in another embodiment.

In some embodiments, the constrained voxel model 155 is synthesized independent from the optimization employed to update the full voxel model 157. FIG. 5 depicts tomographic measurement engine 150 in another embodiment. Like numbered elements depicted in FIG. 5 and described with reference to FIG. 1 are analogous. As illustrated in FIG. 5, tomographic measurement engine 150 includes a constrained voxel model synthesis module 163. Constrained voxel model synthesis module 163 generates the constrained voxel model 155 from measurement data 164. In some embodiments, measurement data 164 are the set of measured images 126. In some other embodiments, measurement data 164 are a subset of the set of measured images 126, e.g., images collected from a subset of nominal angle of incidence, nominal azimuth angle, or both. In some other embodiments, measurement data 164 includes measurement signals from different measurement sources employed to regularize the tomographic optimization. In these embodiments, signal information is enhanced by incorporating measurement results from multiple measurement technologies, e.g., spectroscopic ellipsometry, spectroscopic reflectometry, a soft x-ray reflectometry, other imaging based metrology such as hyperspectral imaging metrology, etc.

In some embodiments, constrained voxel model synthesis module 163 includes a trained constrained voxel model synthesis model. The trained model receives measurement data 164 as input and directly determines a constrained voxel model as output. In some embodiments, the trained model is a machine learning based measurement model (e.g., linear model, neural network model, convolutional network model, etc.). In these embodiments, the model is trained based on measurement data associated with structures having known values of parameters of interest, and thus known voxel model representations. The training data may be based on synthetically generated data, real measurement data from a reference metrology system, or both.

In some embodiments, constrained voxel model synthesis module 163 determines values of one or more parameters characterizing the structure under measurement from measurement data 164 and generates the constrained voxel model from the values of the one or more parameters based on a trained decoder model.

Figure 6:
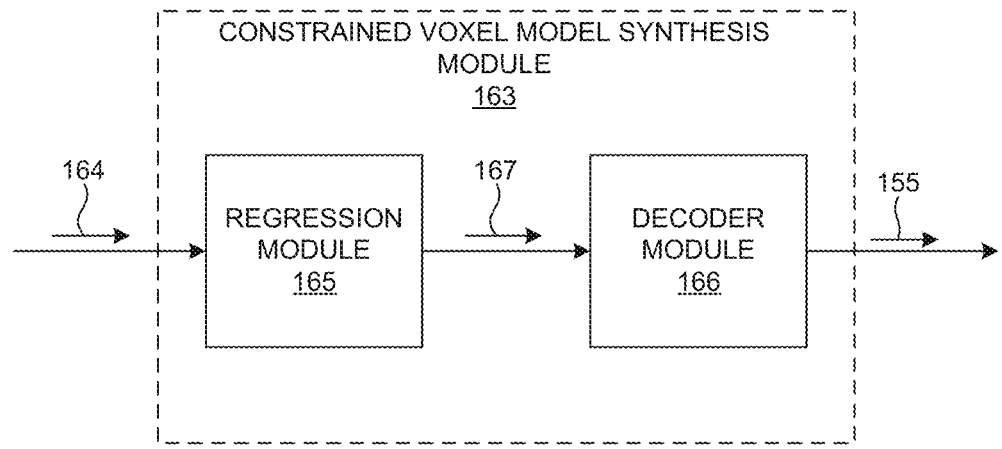
FIG. 6 is a diagram illustrative of a constrained voxel model synthesis module in one embodiment.

FIG. 6 depicts a constrained voxel model synthesis module 163 in one embodiment. As depicted in FIG. 6, constrained voxel model synthesis module 163 includes regression module 165 and decoder module 166. Regression module 165 receives measurement data 164 and determines values of one or more parameters 167 characterizing the structure under measurement by a physical model-based regression analysis on the measurement data 164. Decoder module 166 includes a trained decoder model that transforms the values of the one or more parameters characterizing the structure, e.g., CD, SWA, H, into constrained voxel model 155.

Figure 7:
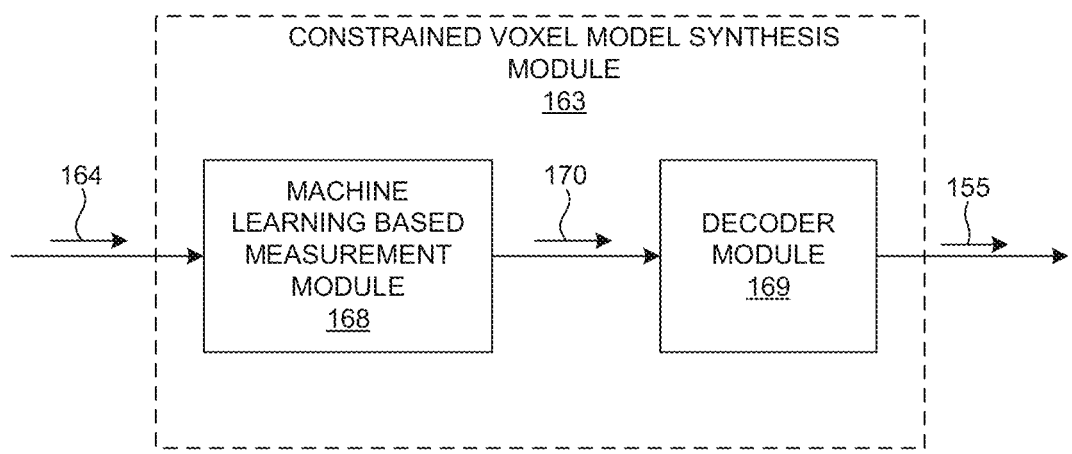
FIG. 7 is a diagram illustrative of a constrained voxel model synthesis module in another embodiment.

FIG. 7 depicts a constrained voxel model synthesis module 163 in another embodiment. As depicted in FIG. 7, constrained voxel model synthesis module 163 includes machine learning based measurement module 168 and decoder module 169. A trained machine learning based model of machine learning based measurement module 168 receives measurement data 164 and directly determines values of one or more parameters 170 characterizing the structure under measurement. Decoder module 169 includes a trained decoder model that transforms the values of the one or more parameters characterizing the structure into constrained voxel model 155. In these embodiments, the machine learning based model is trained based on measurement data associated with structures having known values of the parameters characterizing the structure under measurement. The training data may be based on synthetically generated data, real measurement data from a reference metrology system, or both.

Figure 8:
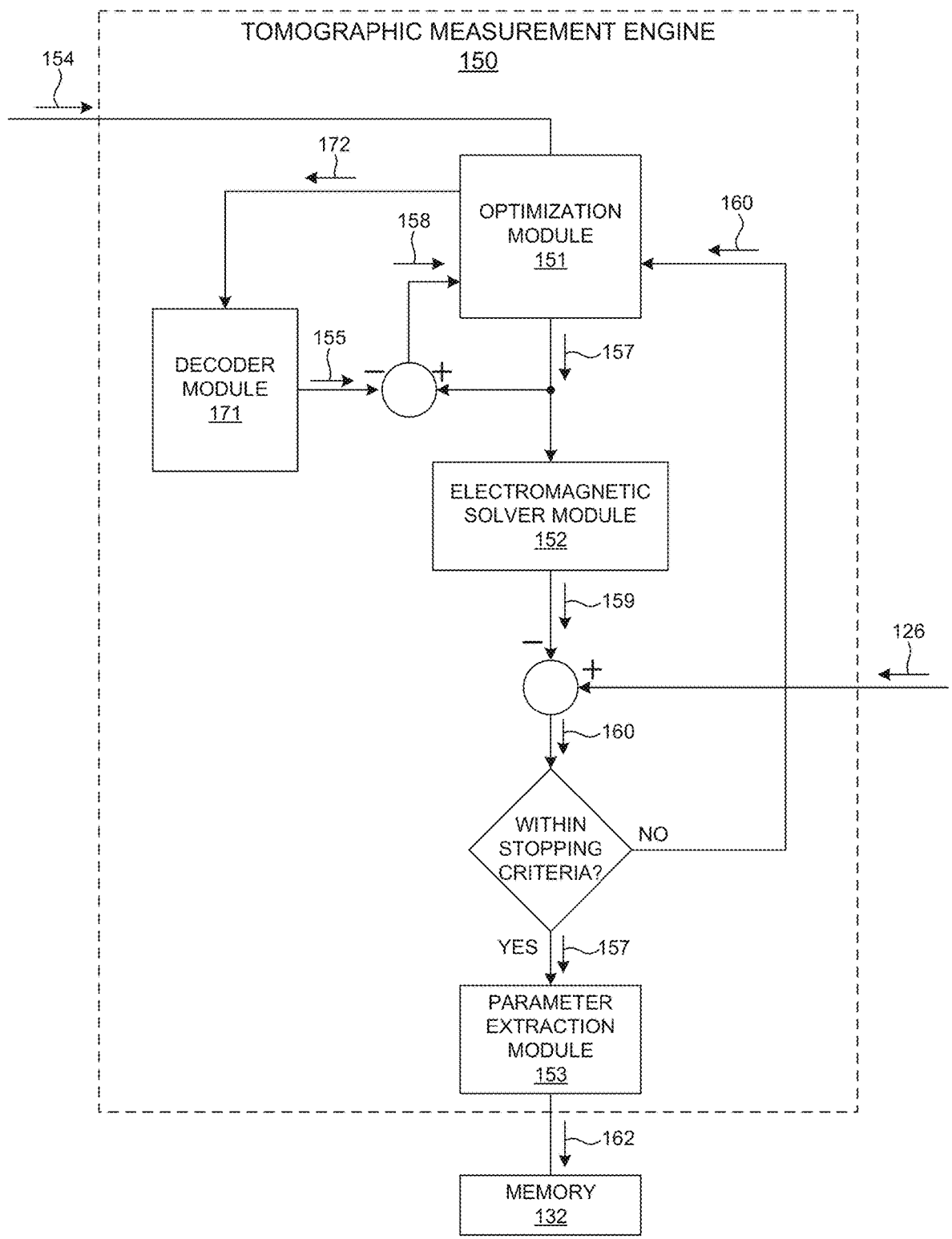
FIG. 8 is a diagram illustrative of an exemplary tomographic measurement engine in yet another embodiment.

In some embodiments, the constrained voxel model 155 is synthesized as part of the optimization employed to update the full voxel model 157. FIG. 8 depicts tomographic measurement engine 150 in yet another embodiment. Like numbered elements depicted in FIG. 8 and described with reference to FIG. 1 are analogous. As illustrated in FIG. 8, tomographic measurement engine 150 includes a decoder module 171. Optimization module 151 determines values of one or more parameters characterizing the structure 172 based on a minimization of the difference 160 between the set of measured images 126 and the set of simulated images 159 and the difference 158 between the voxel model 157 and the constrained voxel model 155. Decoder module 171 includes a trained decoder model that transforms the values of the one or more parameters characterizing the structure into constrained voxel model 155.

In a further aspect, a tomographic optimization is driven by a difference between a set of measured images of the structure and a set of simulated images characterizing each measurement of the structure generated based on the constrained voxel model.

Figure 9:
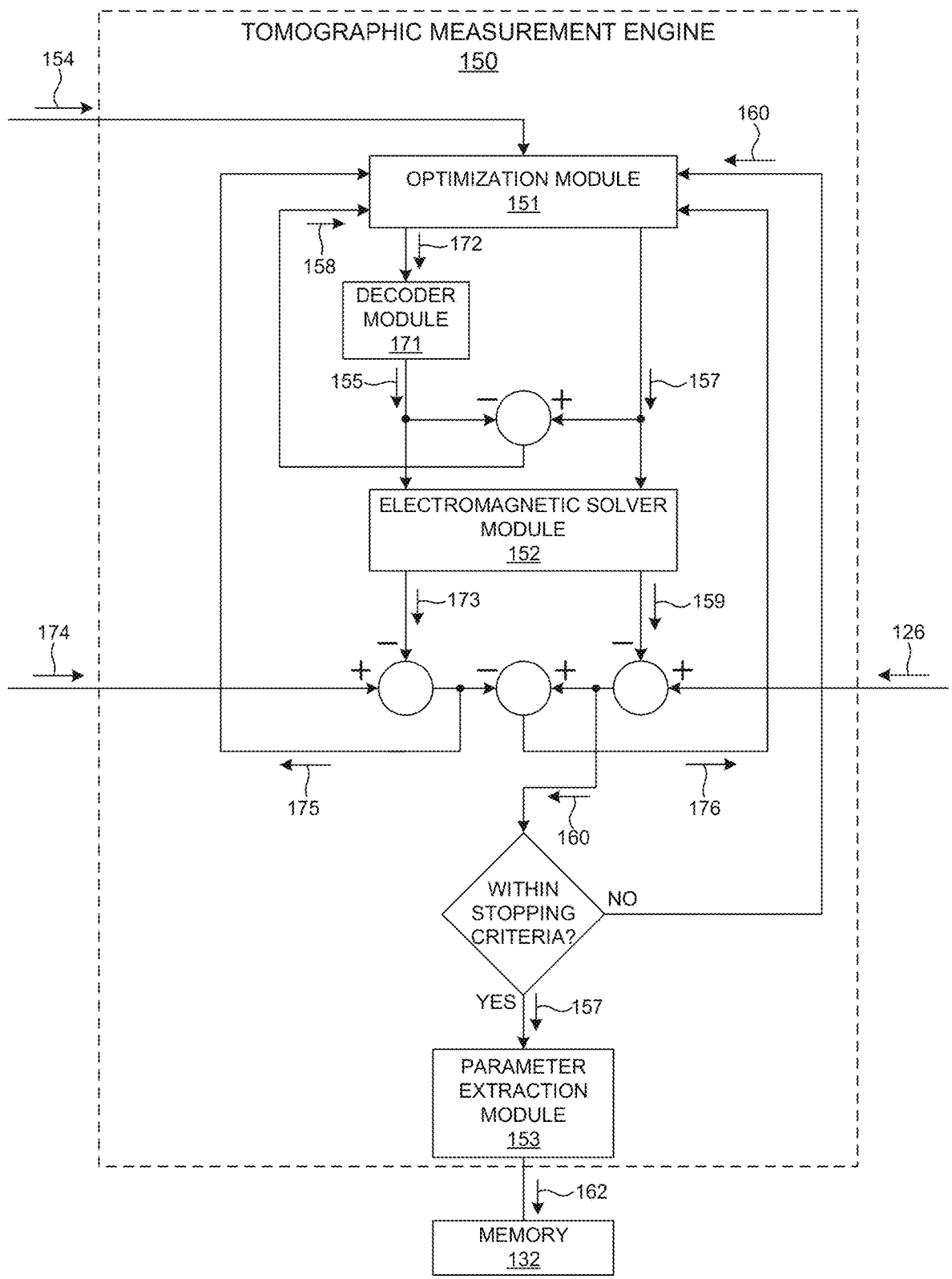
FIG. 9 is a diagram illustrative of an exemplary tomographic measurement engine in yet another embodiment.

FIG. 9 depicts tomographic measurement engine 150 in yet another embodiment. Like numbered elements depicted in FIG. 9 and described with reference to FIGS. 1 and 8 are analogous. As illustrated in FIG. 9, tomographic measurement engine 150 receives a set of measured images 174. In some embodiments, the set of measured images 174 is identical to the set of measured images 126. In some other embodiments, the set of measured images 174 is a subset of the set of measured images 126, e.g., images collected from a subset of nominal angle of incidence, nominal azimuth angle, or both.

In addition, constrained voxel model 155 is communicated to electromagnetic solver module 152. Electromagnetic solver module 152 simulates the measurement of the structure characterized by the constrained voxel model 155 by the semiconductor metrology system at each measurement instance included in the set of measured images 174. Hence, electromagnetic solver 152 generates a set of simulated images 173 that corresponds to the set of measured images 174. Tomographic measurement engine 150 determines the difference between each corresponding simulated image and measured image of the sets of simulated images 173 and measured images 174. The difference images 175 are communicated back to optimization module 151. Optimization module 151 updates of the value associated with each voxel of the voxel model 157 of the structure based in part on difference images 175.

Thus, in some embodiments, optimization module 151 updates the value associated with each voxel of voxel model 157 based on both the difference 160 between the set of measured images 126 and the set of simulated images 159, the difference 158 between the voxel model 157 and the constrained voxel model 155, and the difference 175 between the set of measured images 174 and the set of simulated images 173. In one example, optimization module 151 updates the value associated with each voxel of voxel model 157 that minimizes a loss function illustrated by equation (2).

$$J(P, Vox; Img, S) = \qquad (2)$$
$$\|EMSolv(Vox) - Img\|_\Sigma^2 + \|EMSolv(CVox) - S\|_\Sigma^2 + \gamma_1 \cdot RegV(Vox, CVox)$$

As illustrated by equation (2), loss function, J, includes the terms described with reference to equation (1), however, in addition, the optimization is also driven by the square of the difference between a set of measured images, S, and the simulated images derived from the constrained voxel model, EMSolv(CVox). This term effectively draws the optimization toward a global minimum.

In another further aspect, a tomographic optimization is driven by a difference between a set of simulated images characterizing each measurement of the structure generated based on the voxel model and a set of simulated images characterizing each measurement of the structure generated based on the constrained voxel model.

FIG. 9 depicts tomographic measurement engine 150 in yet another embodiment. Like numbered elements depicted in FIG. 9 and described with reference to FIGS. 1 and 8 are analogous. As illustrated in FIG. 9, tomographic measurement engine 150 receives a set of measured images 174. In some embodiments, the set of measured images 174 is identical to the set of measured images 126. In some other embodiments, the set of measured images 174 is a subset of the set of measured images 126, e.g., images collected from a subset of nominal angle of incidence, nominal azimuth angle, or both.

As depicted in FIG. 9, tomographic measurement engine 150 determines the difference between each corresponding simulated image and measured image of the sets of simulated images 173 and measured images 174. Similarly, tomographic measurement engine 150 determines the difference between each corresponding simulated image and measured image of the sets of simulated images 159 and measured images 126. In addition, tomographic measurement engine 150 determines the difference 176 between difference images 175 and difference images 160. The difference images 176 are communicated back to optimization module 151. Optimization module 151 updates of the value associated with each voxel of the voxel model 157 of the structure based in part on difference images 176.

Thus, in some embodiments, optimization module 151 updates the value associated with each voxel of voxel model 157 based on the difference 160 between the set of measured images 126 and the set of simulated images 159, the difference 158 between the voxel model 157 and the constrained voxel model 155, and the difference 176 between the difference images 160 and the difference images 175. In one example, optimization module 151 updates the value associated with each voxel of voxel model 157 that minimizes a loss function illustrated by equation (3).

$$J(P, Vox; Img, S) = \|EMSolv(Vox) - Img\|_\Sigma^2 + \quad (3)$$
$$\gamma_1 \cdot RegV(Vox, CVox) + \gamma_2 \cdot RegI(EMSolv(Vox), Img, EMSolv(CVox), S)$$

As illustrated by equation (3), loss function, J, includes the terms described with reference to equation (1), however, in addition, loss function, J, includes an image regularization term, RegI, weighted by weighting factor, $\gamma_2$. The regularization term, RegI, is the difference between the difference images generated by the difference between measured images, Img, and corresponding simulated images, EMSolv (Vox), generated based on the voxel model, and the difference images generated by the difference between measured images, S, and corresponding simulated images, EMSolv (VCox).

Furthermore, in some embodiments, optimization module 151 updates the value associated with each voxel of voxel model 157 based on the difference 160 between the set of measured images 126 and the set of simulated images 159, the difference 158 between the voxel model 157 and the constrained voxel model 155, the difference 176 between the difference images 160 and the difference images 175, and the difference 175 between the set of measured images 174 and the set of simulated images 173. In one example, optimization module 151 updates the value associated with each voxel of voxel model 157 that minimizes a loss function illustrated by equation (4).

$$J(P, Vox; Img, S) = \|EMSolv(Vox) - Img\|_\Sigma^2 + \|EMSolv(CVox) - S\|_\Sigma^2 + \quad (4)$$
$$\gamma_1 \cdot RegV(Vox, CVox) + \gamma_2 \cdot RegI((EMSolv(Vox), Img, EMSolv(CVox), S)$$

As described hereinbefore, a decoder model is employed in several embodiments to transform a relatively small set of independent parameters into a voxel model representation having a much larger dimension. In other words, a decoder model provides a mapping from a reduced parameter space to voxel space.

In some embodiments, a decoder model is machine learning based model (e.g., linear model, neural network model, convolutional neural network model, etc.) trained based on synthetically generated data, actual measurement data, or user defined data. However, in general, a decoder model may be suitable linear or non-linear model.

Figure 10:
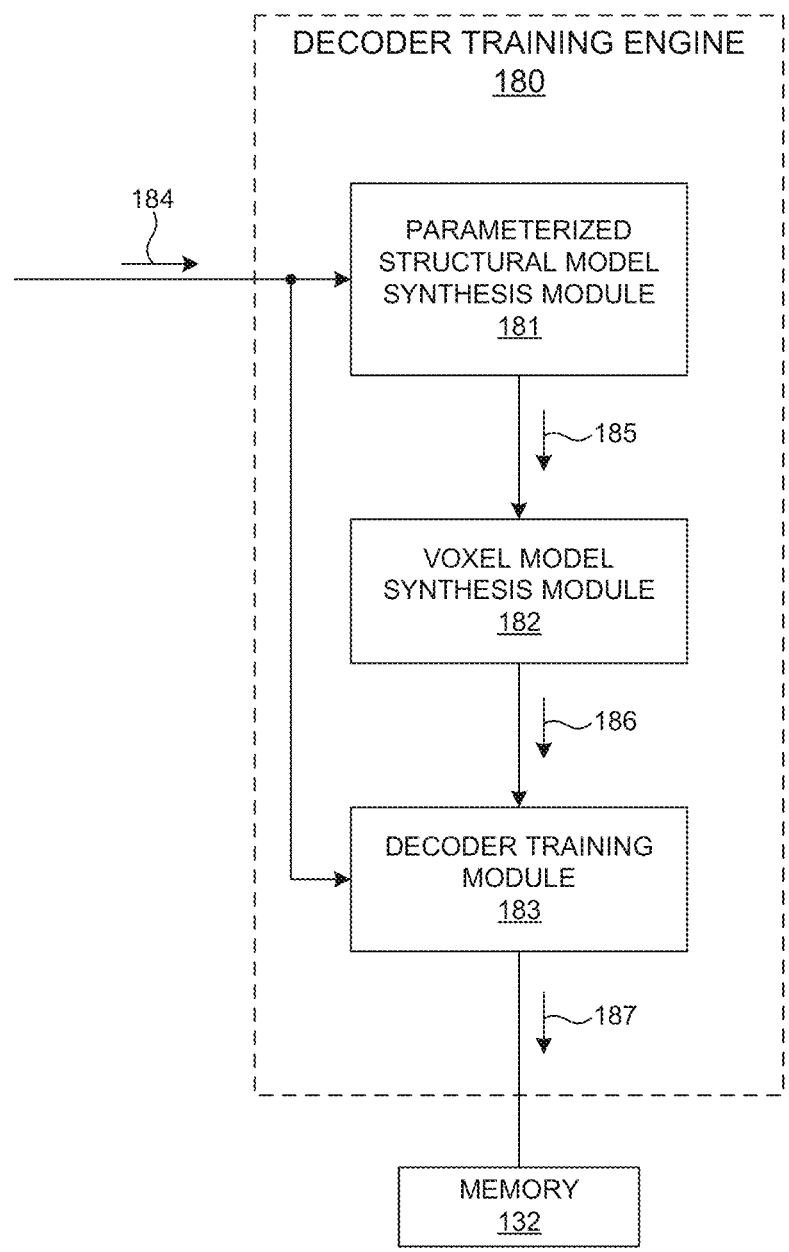
FIG. 10 is a diagram illustrative of a decoder training engine in one embodiment.

FIG. 10 depicts a decoder training engine 180 in one embodiment. In some examples, computing system 130 is configured as decoder training engine 180. As illustrated in FIG. 10, decoder training engine 180 includes a parameterized structural model synthesis module 181, a voxel model synthesis module 182, and a decoder training module 183.

As illustrated in FIG. 10, decoder training engine 180 receives a Design Of Experiments (DOE) set of values 184 of one or more geometric parameters characterizing a structure under measurement, a DOE set of values of one or more process parameters characterizing a semiconductor fabrication process employed to fabricate the structure, or both. Parameterized structure model synthesis module 181 determines a set of parameterized models 185 of the structure based on each of the DOE set of values of the one or more geometric parameters, each of the DOE set of values of the one or more process parameters, or both. Voxel model synthesis module 182 determines a set of voxel models 186 of the structure based on each of the set of parameterized models 185 of the structure. Decoder training module 183 trains the decoder model based on each of the DOE set of values 184 of the one or more geometric parameters, the DOE set of values of the one or more process parameters, or both, and each corresponding voxel model of the set of voxel models 186. The trained decoder model 187 is stored in memory, e.g., memory 132. As illustrated in FIG. 10, decoder training module employs both the DOE set of parameters 184 and the corresponding set of voxel models 186 for training.

Figure 11:
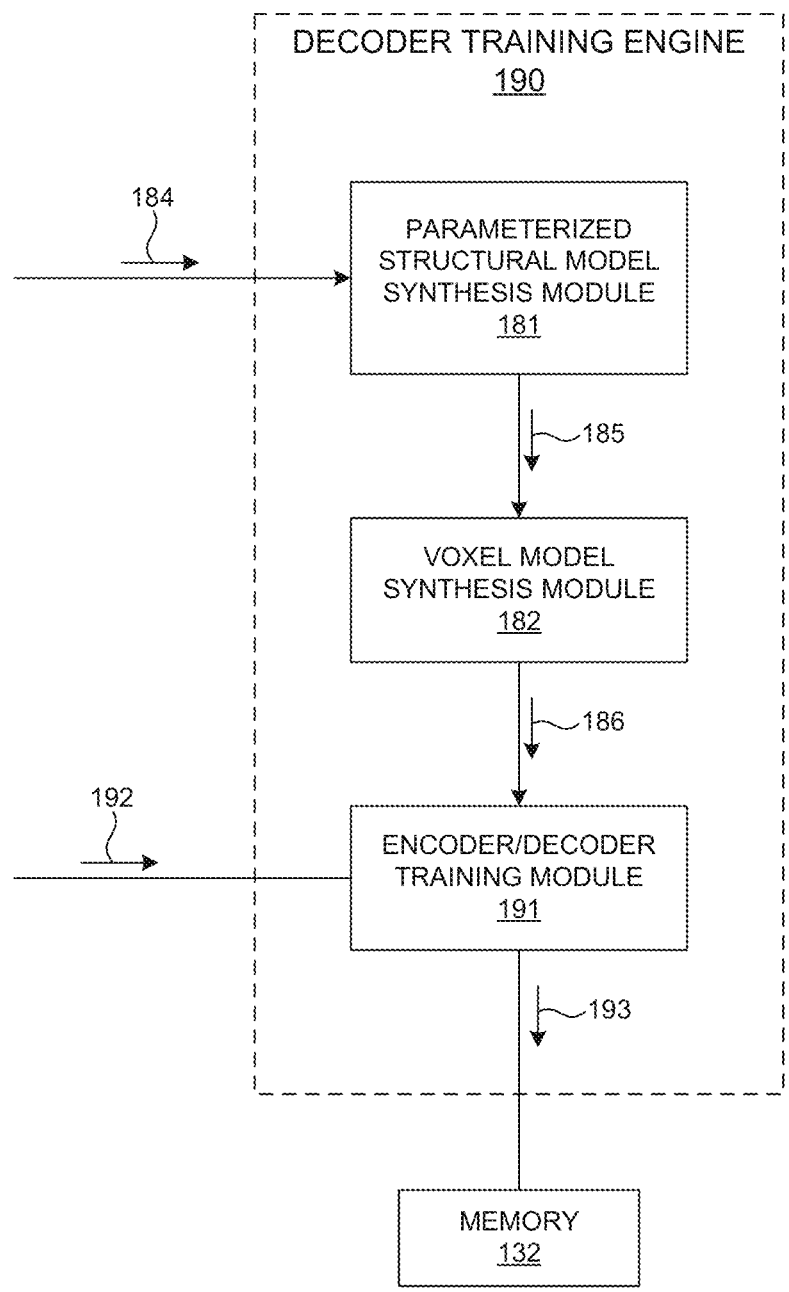
FIG. 11 is a diagram illustrative of a decoder training engine in another embodiment.

FIG. 11 depicts a decoder training engine 190 in one embodiment. In some examples, computing system 130 is configured as decoder training engine 190. As illustrated in FIG. 11, decoder training engine 190 includes a parameterized structural model synthesis module 181, a voxel model synthesis module 182, and an encoder/decoder training module 191. As illustrated in FIG. 11, encoder/decoder training module 191 employs the set of voxel models 186 to train both an autoencoder and the decoder simultaneously.

As illustrated in FIG. 11, decoder training engine 190 receives a Design Of Experiments (DOE) set of values 184 of one or more geometric parameters characterizing a structure under measurement, a DOE set of values of one or more process parameters characterizing a semiconductor fabrication process employed to fabricate the structure, or both. Parameterized structure model synthesis module 181 determines a set of parameterized models 185 of the structure based on each of the DOE set of values of the one or more geometric parameters, each of the DOE set of values of the one or more process parameters, or both. Voxel model synthesis module 182 determines a set of voxel models 186 of the structure based on each of the set of parameterized models 185 of the structure. Encoder/Decoder training module 191 receives an indication 192 of a desired dimension of the parameter space to be provided as input to the trained decoder. For example, the dimension of the parameter space may be an integer number in a range between 1 and 100. Encoder/Decoder training module 191 simultaneously trains an autoencoder, which maps each voxel model of the set of voxel models 186 to a set of values of each parameter of a parameter space having the desired dimension, and a decoder, which maps the set of parameter values to a voxel model. The training iterates until the difference between each voxel model of the voxel models 186 and the corresponding voxel model determined by the decoder from the parameters determined by the autoencoder is minimized. The trained decoder model 193 is stored in memory, e.g., memory 132. As illustrated in FIG. 11, encoder/decoder training module 191 does not employ the DOE set of parameters 184 explicitly in the training, rather, the information from the DOE set of parameters 184 embedded in the set of voxel models 186 is employed during training.

Figure 12:
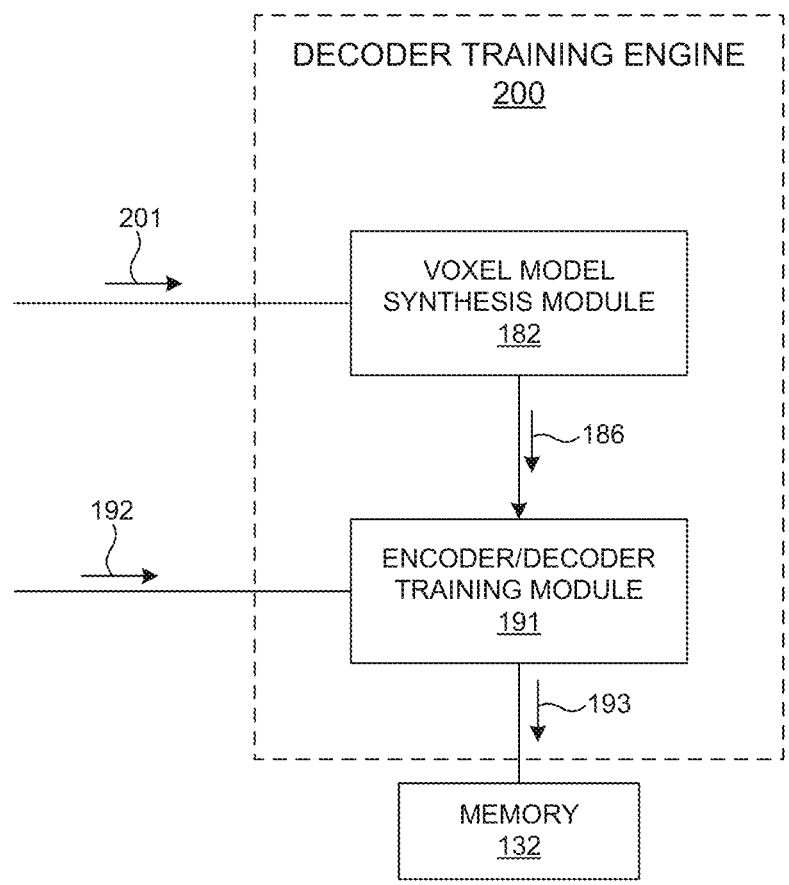
FIG. 12 is a diagram illustrative of a decoder training engine in yet another embodiment.

In some embodiments, a decoder model is trained based on actual measurement data. FIG. 12 depicts a decoder training engine 200 in one embodiment. In some examples, computing system 130 is configured as decoder training engine 200. As illustrated in FIG. 12, decoder training engine 200 includes a voxel model synthesis module 182, and an encoder/decoder training module 191.

Voxel model synthesis module 182 receives parameter variations 201 derived from measurement data from a trusted reference metrology system. One or more Design Of Experiments (DOE) wafers are fabricated including multiple instances of a structure under measurement. Each instance of the structure has a different value of one or more geometric parameters characterizing the structure, one or more process parameters characterizing a semiconductor fabrication process employed to fabricate the structure, or both. A trusted, reference metrology system is employed to measure each instance of the structure disposed on the one or more DOE wafers. The measurement results provided by the reference metrology system are trusted by the user to be sufficiently accurate. A variation of values of the one or more geometric parameters, the one or more process parameters, or both, is determined based on the instances of the structure measured by the trusted reference metrology system. Voxel model synthesis module 182 determines a set of voxel models 186 of the structure based on the variations of the one or more geometric parameters, the one or more process parameters, or both.

Encoder/Decoder training module 191 receives an indication 192 of a desired dimension of the parameter space to be provided as input to the trained decoder. Encoder/Decoder training module 191 simultaneously trains an autoencoder, which maps each voxel model of the set of voxel models 186 to a set of values of each parameter of a parameter space having the desired dimension, and a decoder, which maps the set of parameter values to a voxel model. The training iterates until the difference between each voxel model of the voxel models 186 and the corresponding voxel model determined by the decoder from the parameters determined by the autoencoder is minimized. The trained decoder model 193 is stored in memory, e.g., memory 132.

Figure 13:
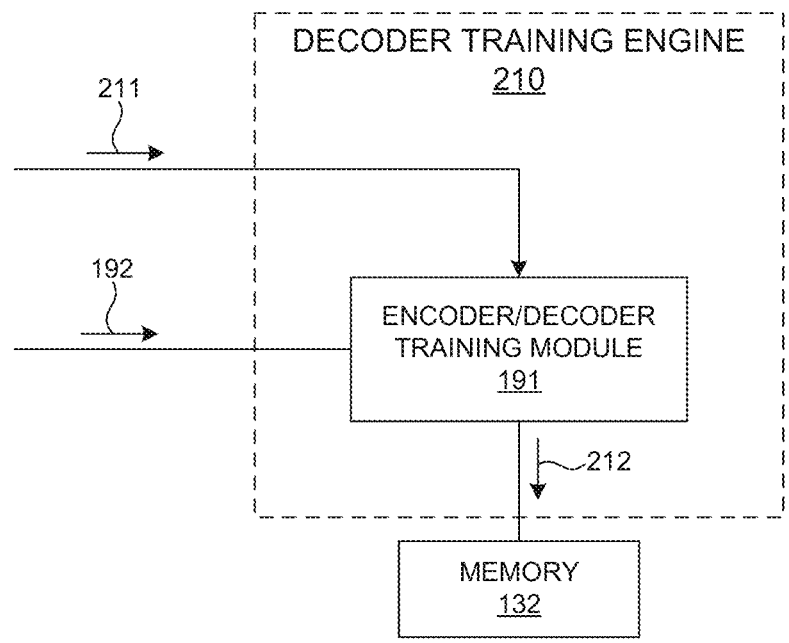
FIG. 13 is a diagram illustrative of a decoder training engine in yet another embodiment.

In some embodiments, a decoder model is trained based on user defined data. FIG. 13 depicts a decoder training engine 210 in one embodiment. In some examples, computing system 130 is configured as decoder training engine 210. As illustrated in FIG. 13, decoder training engine 210 includes an encoder/decoder training module 191.

Encoder/Decoder training module 191 receives a set of voxel models 211 of the structure from a user. In addition, Encoder/Decoder training module 191 receives an indication 192 of a desired dimension of the parameter space to be provided as input to the trained decoder. Encoder/Decoder training module 191 simultaneously trains an autoencoder, which maps each voxel model of the set of voxel models 211 to a set of values of each parameter of a parameter space having the desired dimension, and a decoder, which maps the set of parameter values to a voxel model. The training iterates until the difference between each voxel model of the voxel models 211 and the corresponding voxel model determined by the decoder from the parameters determined by the autoencoder is minimized. The trained decoder model 212 is stored in memory, e.g., memory 132.

As described herein, several different examples of data-driven regularization may be employed to drive a tomographic optimization. In general, any combination of these examples of data-driven regularization may be employed simultaneously to drive a tomographic optimization. For example, multiple different constrained voxel models, e.g., constrained voxel models generated from different measurement sources or combinations of measurement sources, may be employed simultaneously to drive a tomographic optimization via voxel based regularization, image based regularization, or both. The constrained voxel models may be generated from data derived from different measurement sources or combinations of measurement sources. In addition, constrained voxel models employing different sized independent parameter spaces may be employed.

In some examples, optimization module 151 updates the value associated with each voxel of voxel model 157 that minimizes a loss function illustrated by equation (5) including multiple error terms, voxel based regularization terms, image based regularization terms, or any combination thereof.

$$J(P, Vox; Img, S) = \|EMSolv(Vox) - Img\|_\Sigma^2 + \qquad (5)$$
$$\|EMSolv(CVox_1) - S_1\|_\Sigma^2 + \ldots + \|EMSolv(CVox_i) - S_i\|_\Sigma^2 +$$
$$\ldots + \gamma_1 \cdot RegV_1(Vox, CVox_1) + \ldots + \gamma_i \cdot RegV_i(Vox, CVox_i) +$$
$$\ldots + \varepsilon_1 \cdot RegI_1(EMSolv(Vox), Img, EMSolv(CVox_1), S_1) +$$
$$\ldots + \varepsilon_i \cdot RegI_i(EMSolv(Vox), Img, EMSolv(CVox_i), S_i)$$

As depicted in FIG. 2, system 100 includes a single measurement technology (i.e., SAXS). However, in general, system 100 may include any number of different measurement technologies. By way of non-limiting example, system 100 may be configured as a reflective small angle x-ray scatterometer, a soft X-ray reflectometer, spectroscopic ellipsometer (including Mueller matrix ellipsometry), a spectroscopic reflectometer, a spectroscopic scatterometer, an overlay scatterometer, an angular resolved beam profile reflectometer, a polarization resolved beam profile reflectometer, a beam profile reflectometer, a beam profile ellipsometer, any single or multiple wavelength ellipsometer, a hyperspectral imaging system, or any combination thereof. Furthermore, in general, measurement data collected by different measurement technologies and analyzed in accordance with the methods described herein may be collected from multiple tools, a single tool integrating multiple technologies, or a combination thereof.

In a further embodiment, system 100 may include one or more computing systems 130 employed to perform measurements of structures and estimate values of parameters of interest in accordance with the methods described herein. The one or more computing systems 130 may be communicatively coupled to the detector 116. In one aspect, the one or more computing systems 130 are configured to receive measurement data 126 associated with measurements of a structure under measurement (e.g., structure disposed on specimen 101).

In yet another further aspect, the measurement results described herein can be used to provide active feedback to the process tool (e.g., lithography tool, etch tool, deposition tool, etc.). For example, values of measured parameters determined based on measurement methods described herein can be communicated to an etch tool to adjust the etch time to achieve a desired etch depth. In a similar way etch parameters (e.g., etch time, diffusivity, etc.) or deposition parameters (e.g., time, concentration, etc.) may be included in a measurement model to provide active feedback to etch tools or deposition tools, respectively. In some example, corrections to process parameters determined based on measured device parameter values may be communicated to the process tool. In one embodiment, computing system 130 determines values of one or more parameters of interest. In addition, computing system 130 communicates control commands to a process controller based on the determined values of the one or more parameters of interest. The control commands cause the process controller to change the state of the process (e.g., stop the etch process, change the diffusivity, etc.). In one example, a control command causes a process controller to adjust the focus of a lithographic system, a dosage of the lithographic system, or both. In another example, a control command causes a process controller to change the etch rate to improve measured wafer uniformity of a CD parameter.

In some examples, the measurement models are implemented as an element of a SpectraShape® optical critical-dimension metrology system available from KLA-Tencor Corporation, Milpitas, Calif., USA. In this manner, the model is created and ready for use immediately after the spectra are collected by the system.

In some other examples, the measurement models are implemented off-line, for example, by a computing system implementing AcuShape® software available from KLA-Tencor Corporation, Milpitas, Calif., USA. The resulting, trained model may be incorporated as an element of an AcuShape® library that is accessible by a metrology system performing measurements.

Figure 14:
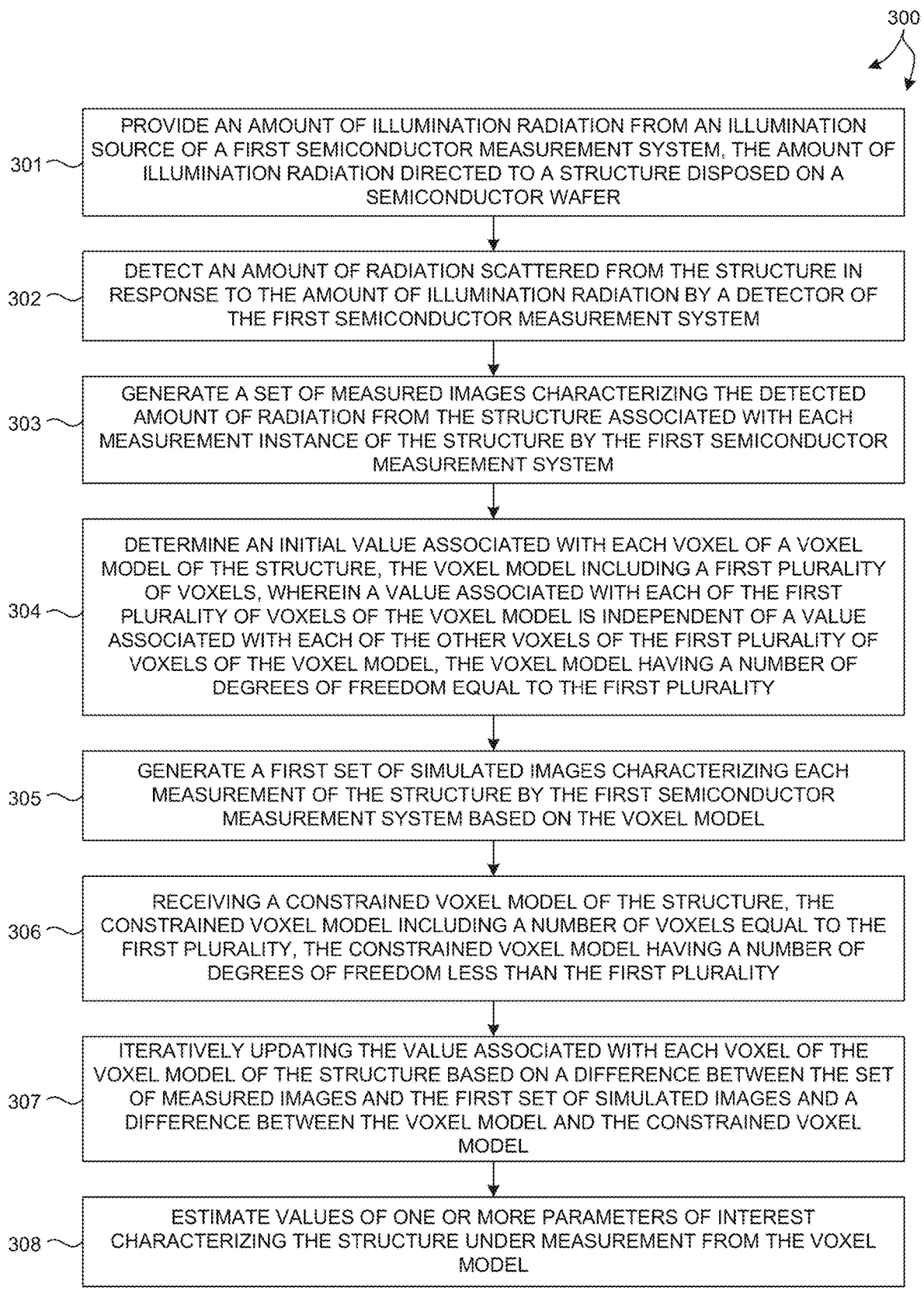
FIG. 14 illustrates a flowchart of a method 300 for estimating values of parameters of interest based on a voxel model and a constrained voxel model.

FIG. 14 illustrates a method 300 for estimating values of one or more parameters of interest from a voxel model and a constrained voxel model in at least one novel aspect. Method 300 is suitable for implementation by a metrology system such as metrology system 100 illustrated in FIG. 2 of the present invention. In one aspect, it is recognized that data processing blocks of method 300 may be carried out via a pre-programmed algorithm executed by one or more processors of computing system 130, or any other general purpose computing system. It is recognized herein that the particular structural aspects of metrology system 100 do not represent limitations and should be interpreted as illustrative only.

In block 301, an amount of illumination radiation is provided by an illumination source of a first semiconductor measurement system. The amount of illumination radiation is directed to a structure disposed on a semiconductor wafer.

In block 302, an amount of radiation scattered from the structure in response to the amount of illumination radiation is detected by a detector of the first semiconductor measurement system.

In block 303, a set of measured images characterizing the detected amount of radiation from the structure associated with each measurement instance of the structure is generated by the first semiconductor measurement system.

In block 304, an initial value associated with each voxel of a voxel model of the structure is determined. The voxel model includes a first plurality of voxels. A value associated with each of the first plurality of voxels of the voxel model is independent of a value associated with each of the other voxels of the first plurality of voxels of the voxel model. The voxel model has a number of degrees of freedom equal to the first plurality.

In block 305, a first set of simulated images characterizing each measurement of the structure by the first semiconductor measurement system is generated based on the voxel model.

In block 306, a constrained voxel model of the structure is received. The constrained voxel model includes a number of voxels equal to the first plurality, however, the constrained voxel model has a number of degrees of freedom less than the first plurality.

In block 307, the value associated with each voxel of the voxel model of the structure is iteratively updated based on a difference between the set of measured images and the first set of simulated images and a difference between the voxel model and the constrained voxel model.

In block 308, values of one or more parameters of interest characterizing the structure under measurement are estimated from the voxel model.

In a further embodiment, system 100 includes one or more computing systems 130 employed to perform measurements of semiconductor structures based on measurement data in accordance with the methods described herein. The one or more computing systems 130 may be communicatively coupled to one or more detectors, active optical elements, process controllers, etc.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to other elements of a metrology system in any manner known in the art. For example, the one or more computing systems 130 may be coupled to computing systems associated with the detectors. In another example, the detectors may be controlled directly by a single computer system coupled to computer system 130.

The computer system 130 of system 100 may be configured to receive and/or acquire data or information from the subsystems of the system (e.g., detectors and the like) by a transmission medium that may include wireline and/or wireless portions. In this manner, the transmission medium may serve as a data link between the computer system 130 and other subsystems of system 100.

Computer system 130 of system 100 may be configured to receive and/or acquire data or information (e.g., measurement results, modeling inputs, modeling results, reference measurement results, etc.) from other systems by a transmission medium that may include wireline and/or wireless portions. In this manner, the transmission medium may serve as a data link between the computer system 130 and other systems (e.g., memory on-board system 100, external memory, or other external systems). For example, the computing system 130 may be configured to receive measurement data from a storage medium (i.e., memory 132 or an external memory) via a data link. For instance, measurement results obtained using the detectors described herein may be stored in a permanent or semi-permanent memory device (e.g., memory 132 or an external memory). In this regard, the measurement results may be imported from on-board memory or from an external memory system. Moreover, the computer system 130 may send data to other systems via a transmission medium. For instance, a measurement model or an estimated parameter value determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the techniques described herein.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:

providing an amount of illumination radiation from an illumination source of a first semiconductor measurement system, the amount of illumination radiation directed to a structure disposed on a semiconductor wafer;

detecting an amount of radiation scattered from the structure in response to the amount of illumination radiation by a detector of the first semiconductor measurement system;

generating a set of measured images characterizing the detected amount of radiation from the structure associated with each measurement instance of the structure by the first semiconductor measurement system;

determining an initial value associated with each voxel of a voxel model of the structure, the voxel model including a first plurality of voxels, wherein a value associated with each of the first plurality of voxels of the voxel model is independent of a value associated with each of the other voxels of the first plurality of voxels of the voxel model, the voxel model having a number of degrees of freedom equal to the first plurality;

generating a first set of simulated images characterizing each measurement of the structure by the first semiconductor measurement system based on the voxel model;

receiving a constrained voxel model of the structure, the constrained voxel model including a number of voxels equal to the first plurality, the constrained voxel model having a number of degrees of freedom less than the first plurality;

iteratively updating the value associated with each voxel of the voxel model of the structure based on a difference between the set of measured images and the first set of simulated images and a difference between the voxel model and the constrained voxel model; and estimating values of one or more parameters of interest characterizing the structure under measurement from the voxel model.

2. The method of claim 1, further comprising:
determining the constrained voxel model from the set of measured images, a subset of the set of measured images, an amount of measurement data collected from the structure by a second semiconductor measurement system, or a combination thereof.

3. The method of claim 2, wherein the constrained voxel model is determined by a trained constrained voxel model synthesis model.

4. The method of claim 2, wherein the determining of the constrained voxel model involves:
determining values of one or more parameters characterizing the structure from the set of measured images, the subset of the set of measured images, the amount of measurement data collected from the structure by another semiconductor measurement system, or a combination thereof; and generating the constrained voxel model from the values of the one or more parameters based on a trained decoder model.

5. The method of claim 4, wherein the determining of the values of the one or more parameters characterizing the structure is based on a regression model or a trained machine learning based model.

6. The method of claim 4, wherein the determining of the values of the one or more parameters characterizing the structure is based on a minimization of the difference between the set of measured images and the set of simulated images and the difference between the voxel model and the constrained voxel model.

7. The method of claim 1, further comprising:
generating a second set of simulated images characterizing each measurement of the structure by the semiconductor measurement system based on the constrained voxel model, wherein the updating of the value associated with each voxel of the voxel model of the structure is also based on a difference between the set of measured images or a subset of the set of measured images and the second set of simulated images.

8. The method of claim 1, further comprising:
generating a second set of simulated images characterizing each measurement of the structure by the semiconductor measurement system based on the constrained voxel model, wherein the updating of the value associated with each voxel of the voxel model of the structure is also based on a difference between the first set of simulated images and the second set of simulated images.

9. The method of claim 4, further comprising:
generating a Design Of Experiments (DOE) set of values of one or more geometric parameters characterizing the structure, a DOE set of values of one or more process parameters characterizing a semiconductor fabrication process employed to fabricate the structure, or both;

determining a set of parameterized models of the structure based on each of the DOE set of values of the one or more geometric parameters, each of the DOE set of values of the one or more process parameters, or both;

determining a set of voxel models of the structure based on each of the set of parameterized models of the structure; and training the decoder model based on the DOE set of values of the one or more geometric parameters, the DOE set of values of the one or more process parameters, or both, and the set of voxel models.

10. The method of claim 4, further comprising:
fabricating one or more Design Of Experiments (DOE) wafers including multiple instances of the structure, each instance having a different value of one or more geometric parameters characterizing the structure, one or more process parameters characterizing a semiconductor fabrication process employed to fabricate the structure, or both;

measuring each instance of the structure disposed on the one or more DOE wafers using a trusted reference metrology system;

estimating a variation of values of the one or more geometric parameters, the one or more process parameters, or both, based on the instances of the structure measured by the trusted reference metrology system;

determining a set of voxel models of the structure based on the variation of the one or more geometric parameters, the one or more process parameters, or both; and training the decoder model based on the set of voxel models.

11. The method of claim 4, further comprising:
receiving a set of voxel models of the structure from a user; and training the decoder model based on the set of voxel models.

12. The method of claim 1, wherein the amount of illumination radiation directed to the measurement site on the surface of the semiconductor wafer at each measurement instance is provided at a plurality of different angles of incidence, a plurality of different azimuth angles, or both.

13. The method of claim 1, wherein the one or more parameters of interest include any of a geometric parameter of interest, a process parameter of interest, an electrical parameter of interest, and a dispersion parameter of interest.

14. The method of claim 1, wherein the one or more parameters of interest include any of an overlay dimension, a critical dimension, a lithographic focus, and a lithographic dosage.

15. The method of claim 1, wherein the first semiconductor measurement system is a small angle x-ray scatterometer.

16. The method of claim 2, wherein the second semiconductor measurement system is any of a spectroscopic ellipsometer, a spectroscopic reflectometer, a soft x-ray reflectometer, an imaging system, and a hyperspectral imaging system.

17. A system comprising:
an illumination source of a first semiconductor measurement system configured to provide an amount of illumination radiation directed to a structure disposed on a semiconductor wafer;

a detector of the first semiconductor measurement system configured to detect an amount of radiation scattered from the structure in response to the amount of illumination radiation; and a non-transient, computer-readable medium storing instructions that, when executed by one or more processors, causes the one or more processors to:
generate a set of measured images characterizing the detected amount of radiation from the structure associated with each measurement instance of the structure by the first semiconductor measurement system;
determine an initial value associated with each voxel of a voxel model of the structure, the voxel model including a first plurality of voxels, wherein a value associated with each of the first plurality of voxels of the voxel model is independent of a value associated with each of the other voxels of the first plurality of voxels of the voxel model, the voxel model having a number of degrees of freedom equal to the first plurality;
generate a first set of simulated images characterizing each measurement of the structure by the first semiconductor measurement system based on the voxel model;
receive a constrained voxel model of the structure, the constrained voxel model including a number of voxels equal to the first plurality, the constrained voxel model having a number of degrees of freedom less than the first plurality;
iteratively update the value associated with each voxel of the voxel model of the structure based on a difference between the set of measured images and the first set of simulated images and a difference between the voxel model and the constrained voxel model; and
estimate values of one or more parameters of interest characterizing the structure under measurement from the voxel model.

18. The system of claim 17, the non-transient, computer-readable medium further storing instructions that, when executed by the one or more processors, causes the one or more processors to:
determine the constrained voxel model from the set of measured images, a subset of the set of measured images, an amount of measurement data collected from the structure by a second semiconductor measurement system, or a combination thereof.

19. The system of claim 17, the non-transient, computer-readable medium further storing instructions that, when executed by the one or more processors, causes the one or more processors to:
generate a second set of simulated images characterizing each measurement of the structure by the semiconductor measurement system based on the constrained voxel model, wherein the updating of the value associated with each voxel of the voxel model of the structure is also based on a difference between the set of measured images or a subset of the set of measured images and the second set of simulated images.

20. The system of claim 17, the non-transient, computer-readable medium further storing instructions that, when executed by the one or more processors, causes the one or more processors to:
generate a second set of simulated images characterizing each measurement of the structure by the semiconductor measurement system based on the constrained voxel model, wherein the updating of the value associated with each voxel of the voxel model of the structure is also based on a difference between the first set of simulated images and the second set of simulated images.

21. A semiconductor measurement system comprising:
an illumination source configured to provide an amount of illumination radiation directed to a structure disposed on a semiconductor wafer;
a detector configured to detect an amount of radiation scattered from the structure in response to the amount of illumination radiation; and
a computing system configured to:
generate a set of measured images characterizing the detected amount of radiation from the structure associated with each measurement instance of the structure;
determine an initial value associated with each voxel of a voxel model of the structure, the voxel model including a first plurality of voxels, wherein a value associated with each of the first plurality of voxels of the voxel model is independent of a value associated with each of the other voxels of the first plurality of voxels of the voxel model, the voxel model having a number of degrees of freedom equal to the first plurality;
generate a first set of simulated images characterizing each measurement of the structure based on the voxel model;
receive a constrained voxel model of the structure, the constrained voxel model including a number of voxels equal to the first plurality, the constrained voxel model having a number of degrees of freedom less than the first plurality;
iteratively update the value associated with each voxel of the voxel model of the structure based on a difference between the set of measured images and the first set of simulated images and a difference between the voxel model and the constrained voxel model; and
estimate values of one or more parameters of interest characterizing the structure under measurement from the voxel model.

22. The semiconductor measurement system of claim 21, the computing system further configured to:
determine the constrained voxel model from the set of measured images, a subset of the set of measured images, an amount of measurement data collected from the structure by another semiconductor measurement system, or a combination thereof.

23. The semiconductor measurement system of claim 21, the computing system further configured to:
generate a second set of simulated images characterizing each measurement of the structure by the semiconductor measurement system based on the constrained voxel model, wherein the updating of the value associated with each voxel of the voxel model of the structure is also based on a difference between the set of measured images or a subset of the set of measured images and the second set of simulated images.

24. The semiconductor measurement system of claim 21, the computing system further configured to:
generate a second set of simulated images characterizing each measurement of the structure by the semiconductor measurement system based on the constrained voxel model, wherein the updating of the value associated with each voxel of the voxel model of the structure is also based on a difference between the first set of simulated images and the second set of simulated images.

* * * * *